US008824008B2

(12) United States Patent
Kubota et al.

(10) Patent No.: US 8,824,008 B2
(45) Date of Patent: Sep. 2, 2014

(54) IMAGE FORMING APPARATUS AND METHOD, AND NON-TRANSITORY COMPUTER READABLE MEDIUM

(75) Inventors: Kousuke Kubota, Kanagawa (JP); Tetsuhiro Inoue, Kanagawa (JP); Tsutomu Udaka, Kanagawa (JP); Kenta Ogata, Kanagawa (JP); Osamu Goto, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 52 days.

(21) Appl. No.: 13/569,924

(22) Filed: Aug. 8, 2012

(65) Prior Publication Data

US 2013/0258355 A1 Oct. 3, 2013

(30) Foreign Application Priority Data

Mar. 27, 2012 (JP) ................................ 2012-071042

(51) Int. Cl.
*G06F 15/00* (2006.01)

(52) U.S. Cl.
USPC ............... 358/1.9; 358/518; 358/474; 399/39

(58) Field of Classification Search
None
See application file for complete search history.

(56) References Cited

U.S. PATENT DOCUMENTS

| | | | | |
|---|---|---|---|---|
| 2008/0043299 | A1 * | 2/2008 | Ikeda | 358/518 |
| 2010/0053646 | A1 * | 3/2010 | Shishikura et al. | 358/1.9 |
| 2010/0079824 | A1 * | 4/2010 | Murayama | 358/474 |
| 2010/0080603 | A1 | 4/2010 | Takahashi | |
| 2010/0172662 | A1 * | 7/2010 | Ogawa | 399/39 |

FOREIGN PATENT DOCUMENTS

| | | | |
|---|---|---|---|
| JP | 2009-244505 | A | 10/2009 |
| JP | 4497223 | B2 | 7/2010 |

* cited by examiner

*Primary Examiner* — Mark Zimmerman
*Assistant Examiner* — Helen Q Zong
(74) *Attorney, Agent, or Firm* — Sughrue Mion, PLLC

(57) ABSTRACT

An image forming apparatus includes the following elements. An image forming unit forms an image by using plural predetermined colors. An index forming unit causes the image forming unit to form three or more consecutive image correcting indexes of one type by using an identical color, the image correcting indexes being used for correcting misregistration of an image to be formed. The image correcting indexes are sequentially transferred to an image carrier. A detector includes a light source emitting light to the image correcting indexes and a light receiver receiving light reflected by the image carrier and the image correcting indexes to generate a detection signal. A position specifying unit specifies a position of an image correcting index located at the center of three consecutive image correcting indexes by using the detection signal. A misregistration correcting unit corrects misregistration of an image to be formed by using the specified position.

5 Claims, 14 Drawing Sheets

IMAGE FORMING APPARATUS AND METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2012-071042 filed Mar. 27, 2012.

BACKGROUND

Technical Field

The present invention relates to an image forming apparatus and method and a non-transitory computer readable medium.

SUMMARY

According to an aspect of the invention, there is provided an image forming apparatus including the following elements. An image forming unit forms an image by using plural predetermined colors. An index forming unit causes the image forming unit to form three or more consecutive image correcting indexes of one type by using an identical color, the image correcting indexes being used for correcting misregistration of an image to be formed by the image forming unit. The image correcting indexes formed by the image forming unit are sequentially transferred to an image carrier. A detector includes a light source that emits light to the image correcting indexes and a light receiver that receives light reflected by the image carrier and the image correcting indexes so as to generate a detection signal for detecting the image correcting indexes. A position specifying unit specifies a position of an image correcting index located at the center of three consecutive image correcting indexes by using the detection signal obtained from the light receiver of the detector. A misregistration correcting unit corrects misregistration of an image to be formed by the image forming unit by using the specified position of the image correcting index located at the center of the three consecutive image correcting indexes.

BRIEF DESCRIPTION OF THE DRAWINGS

An exemplary embodiment of the present invention will be described in detail based on the following figures, wherein.

DETAILED DESCRIPTION

An exemplary embodiment of the present invention will be described below in detail with reference to the accompanying drawings.

Image Forming Apparatus

Figure 1:
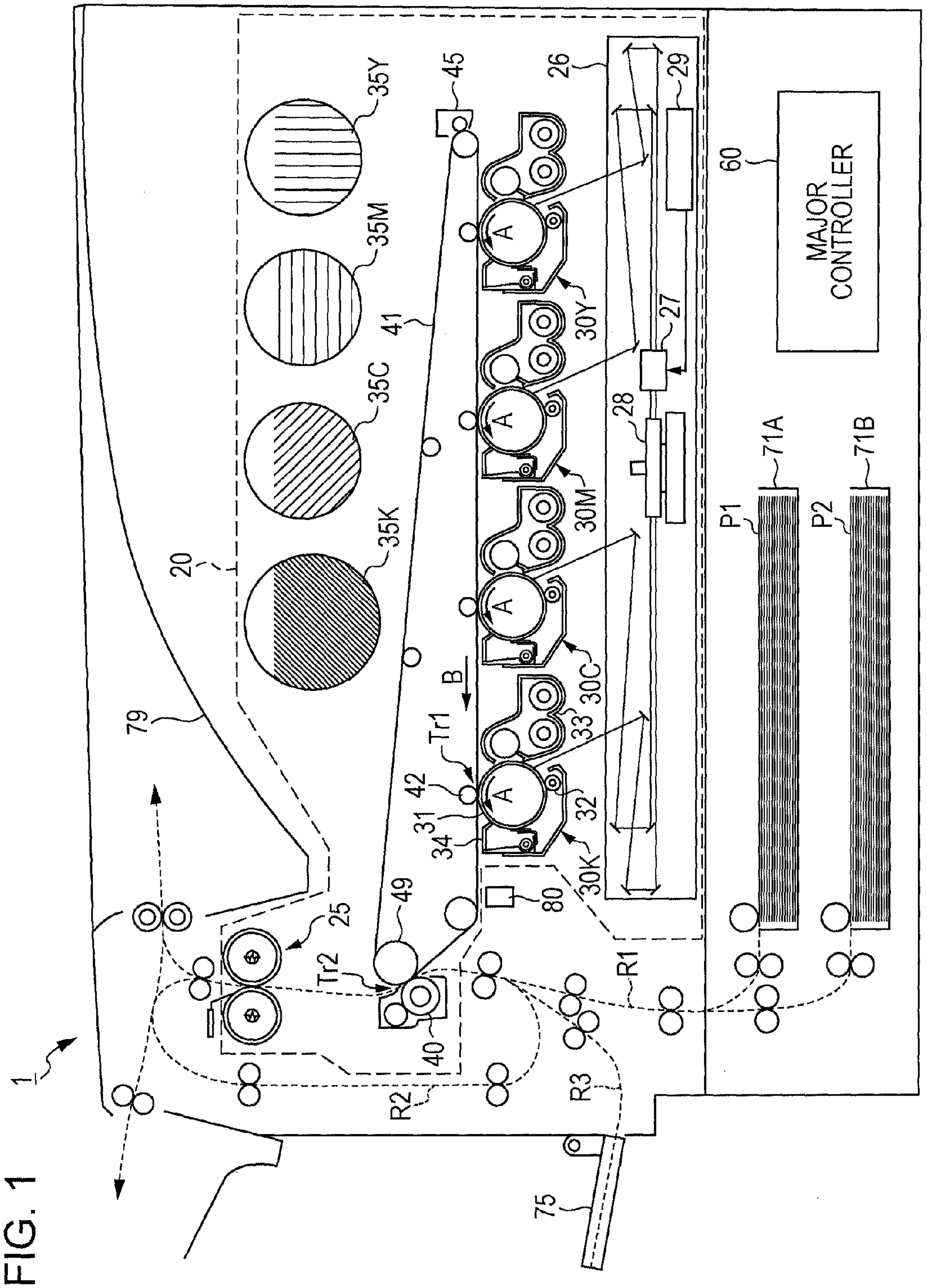
FIG. 1 illustrates the configuration of an image forming apparatus according to an exemplary embodiment of the invention.

FIG. 1 illustrates the configuration of an image forming apparatus 1 according to an exemplary embodiment of the invention. The image forming apparatus 1 shown in FIG. 1, which is a so-called tandem digital color printer, includes an image forming processor 20 and a major controller 60. The image forming processor 20 forms color images on the basis of image data. The major controller 60 controls the operation of the image forming processor 20.

The image forming processor 20 includes four image forming units 30Y, 30M, 30C, and 30K (may also be called an "image forming unit 30" or "image forming units 30") that are disposed in parallel with one another at regular intervals and form toner images of yellow (Y), magenta (M), cyan (C), and black (K), respectively. Each of the image forming units 30Y, 30M, 30C, and 30K is an example of an image forming unit. In addition to the image forming units 30Y, 30M, 30C, and 30K, the image forming processor 20 may include image forming units that form toner images of other colors, e.g., light cyan (LC), light magenta (LM), and corporate color. In this case, the image forming processor 20 includes image forming units that form images of five or more colors.

The image forming units 30 each include a photoconductor drum 31, a charging roller 32, a developing device 33, and a drum cleaner 34. The photoconductor drum 31 forms an electrostatic latent image thereon while rotating in the direction indicated by the arrow A. The charging roller 32 charges the surface of the photoconductor drum 31. The developing device 33 develops an electrostatic latent image formed on the photoconductor drum 31. The drum cleaner 34 cleans the surface of the photoconductor drum 31 subjected to a first transfer operation. The developing devices 33 provided in the image forming units 30Y, 30M, 30C, and 30K develop electrostatic latent images formed on the photoconductor drums 31 by using Y, M, C, and K toners supplied from toner containers 35Y, 35M, 35C, and 35K, respectively, thereby forming Y, M, C, and K toner images.

The image forming processor 20 also includes a laser exposure device 26 and an intermediate transfer belt 41. The laser exposure device 26, which is an example of an exposure device, exposes the photoconductor drums 31 provided in the associated image forming units 30 to, for example, laser light. The Y, M, C, and K toner images formed on the photoconductor drums 31 of the image forming units 30 are transferred onto the intermediate transfer belt 41, and then, the superposed multiple toner images are transported while being held on the intermediate transfer belt 41. The image forming processor 20 also includes first transfer rollers 42, a second transfer roller 40, and a fixing device 25. The first transfer rollers 42 sequentially transfer the Y, M, C, and K toner images formed in the associated image forming units 30 onto the intermediate transfer belt 41 at positions corresponding to first transfer portions Tr1 (first transfer operation). The second transfer roller 40 simultaneously transfers the superposed toner images held on the intermediate transfer belt 41 onto a sheet of paper (P1 or P2), which is a recording medium (recording paper), at a position corresponding to a second transfer portion Tr2. The fixing device 25 fixes the toner images to a sheet of paper P.

A detection sensor 80, which is an example of a detector, is disposed on the farther upstream side than the second transfer portion Tr2 (second transfer roller 40) and on the farther downstream side than the K image forming unit 30K in the moving direction of the intermediate transfer belt 41. The detection sensor 80 is disposed near a corner of the intermediate transfer belt 41 in a direction perpendicular to the moving direction of the intermediate transfer belt 41 (see FIG. 2). The detection sensor 80 reads an image quality adjusting pattern (image quality adjusting toner images), which is used for performing registration control, formed in a region near a corner of the intermediate transfer belt 41, and thereby detects positions of the image quality adjusting toner images in order to perform registration control of the color image quality adjusting toner images, which will be discussed later. That is, the intermediate transfer belt 41 serves as an image carrier onto which image quality adjusting toner images formed by the image forming unit 30 are sequentially transferred.

The laser exposure device 26 includes a semiconductor laser 27, which serves as a light source, a scanning optical system (not shown) that exposes the photoconductor drums 31 to laser light, a rotating polygon (polygon mirror) 28 formed in, for example, an equilateral hexagonal prism, and a laser driver 29 that controls the driving of the semiconductor laser 27. The laser driver 29 obtains image data subjected to image processing, a control signal for correcting the exposure timings in the lateral direction and in the process direction, a control signal for correcting the amount of laser light, etc., from the major controller 60, thereby controlling ON/OFF operations of the semiconductor laser 27.

The first transfer rollers 42 receive a first transfer bias voltage from a first transfer power source (not shown) and transfer toner images of the individual colors onto the intermediate transfer belt 41. The second transfer roller 40 receives a second transfer bias voltage from a second transfer power source (not shown) and transfers superposed toner images onto a sheet of paper P.

The fixing device 25 includes a fixing roller having a built-in heating source and a pressurizing roller, and allows a sheet of paper P on which not-yet-fixed toner images are held to pass between the fixing roller and the pressurizing roller, thereby fixing the toner images to the sheet P.

In the image forming apparatus 1 of this exemplary embodiment, the laser exposure device 26 is used as an example of an exposure device. However, an exposure device using a light emitting diode (LED) array or using an organic electroluminescence (EL) may be utilized.

Image Forming Operation

The image forming apparatus 1 obtains image data from a personal computer (PC) or an image reader (scanner), neither of which is shown, and performs predetermined image processing on the obtained image data, thereby generating plural items of image data of individual colors separated from the received image data (plural items of color image data). Then, the plural items of color image data are supplied to the laser exposure device 26 of the image forming processor 20.

Meanwhile, in each of the image forming units 30, the photoconductor drum 31 is charged by the charging roller 32. Then, the laser exposure device 26 exposes the charged photoconductor drum 31 to laser light. The ON/OFF operations of the laser light are controlled on the basis of the supplied plural items of color image data or various control signals. As a result of this scanning operation, electrostatic latent images of the individual colors are formed on the associated photoconductor drums 31. The electrostatic latent images formed on the photoconductor drums 31 are developed by the associated developing devices 33, thereby forming toner images of the individual colors on the associated photoconductor drums 31.

The toner images formed in the associated image forming units 30 are sequentially transferred onto the intermediate transfer belt 41, which is rotated in the direction indicated by the arrow B in FIG. 1, by using the associated first transfer rollers 42. With this transfer operation, superposed toner images obtained by superposing the toner images of the individual colors on one another are formed on the intermediate transfer belt 41. In accordance with the movement of the intermediate transfer belt 41, the superposed toner images are transported to the second transfer portion Tr2 at which the second transfer roller 40 and a back-up roller 49 are disposed.

In the image forming apparatus 1, plural sheet storage sections 71A and 71B are provided. In response to an instruction from a user through the use of an operation input panel (not shown), sheets P1 stored in the sheet storage section 71A are extracted. The extracted sheets P1 are transported one by one along a transport path R1 and are each transported to the second transfer portion Tr2 in accordance with the timing at which the superposed toner images on the intermediate transfer belt 41 are transported to the second transfer portion Tr2. Then, the superposed toner images are simultaneously transferred onto a sheet P1 by the action of a transferring electric field formed on the second transfer portion Tr2.

Transportation of sheets P to the second transfer portion Tr2 may be performed along the transport path R1 (sheets P1 and P2 stored in the sheet storage sections 71A and 71B, respectively, are transported along the transport path R1). Alternatively, sheets P may be transported to the second transfer portion Tr2 along a transport path R2, which is used when performing double-sided printing on sheets P, or along a transport path R3, which is used when performing manual feeding by using a manual-feeding sheet storage section 75.

Subsequently, a sheet P1 onto which the superposed toner images are transferred at the second transfer portion Tr2 is separated from the intermediate transfer belt 41 and is transported to the fixing device 25. The fixing device 25 fixes the superposed images to the sheet P1. Then, the sheet P1 on which the fixed images are formed is transported to a sheet stacking section 79 provided in a discharge unit of the image forming apparatus 1. Meanwhile, toner remaining on the intermediate transfer belt 41 which has not been transferred to the sheet P1 is removed by a belt cleaner 45, which is disposed in contact with the intermediate transfer belt 41. Then, the image forming apparatus 1 is ready for the next image forming cycle.

In this manner, an image forming operation in the image forming apparatus 1 is performed repeatedly a number of times as the specified number of sheets.

Registration Control

A description will now be given of image position correction control for correcting misregistration of toner images formed in the associated image forming units 30 (so-called "registration control").

The relative positions of the photoconductor drums 31 disposed in the associated image forming units 30 to the intermediate transfer belt 41 vary due to, for example, a change in the environmental temperature or a rise in the temperature in the image forming apparatus 1. Additionally, the state of the photoconductor drum 31 or a developer within the developing device 33 disposed in each image forming unit 30 is changed due to internal factors, such as the accumulated operating time, the accumulated non-operating time, and the use record of the image forming apparatus 1, or external factors, such as temperature/humidity environments in the image forming apparatus 1.

Accordingly, in the image forming apparatus 1 of this exemplary embodiment, registration control for reducing the occurrence of color misregistration is performed in the following manner. Under circumstances where the temperature within the image forming apparatus 1 may have been changed since the image forming apparatus 1 has not been used for a long time after a previous image forming operation, such as when the temperature within the image forming apparatus 1 exceeds a preset temperature, when the image forming operation has been performed in excess of a predetermined number of sheets, when the major power source (not shown) of the image forming apparatus 1 is switched ON, or when the front cover of the image forming apparatus 1 is opened, the misregistration of toner images on the intermediate transfer belt 41 is adjusted to an allowable level.

Configuration for Performing Registration Control

Figure 2:
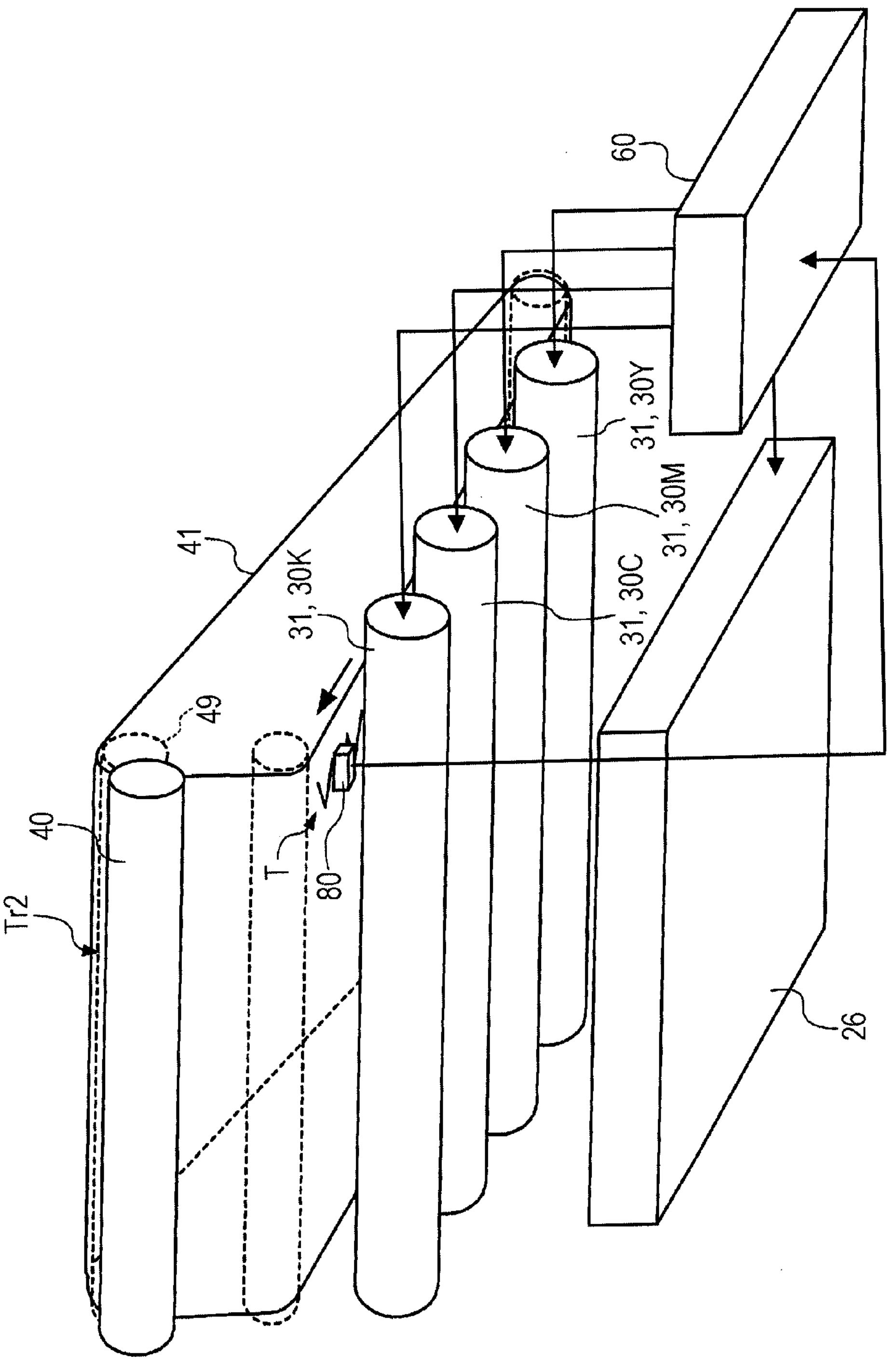
FIG. 2 illustrates an example of the configuration for performing registration control.

FIG. 2 illustrates an example of the configuration for performing registration control. In the image forming apparatus 1 of this exemplary embodiment, the detection sensor 80 is provided, as shown in FIG. 2, at a position on the farther upstream side than the second transfer portion Tr2 (second transfer roller 40) and on the farther downstream side than the K image forming unit 30K in the moving direction of the intermediate transfer belt 41. The detection sensor 80 is disposed near a corner of the intermediate transfer belt 41 in a direction (lateral direction) intersecting with the moving direction of the intermediate transfer belt 41. In this exemplary embodiment, the detection sensor 80 is disposed near a corner of the intermediate transfer belt 41 which opposes the photoconductor drum 31 on which scanning exposure by the laser exposure device 26 is to be started. The detection sensor 80 may be disposed near a central portion of the intermediate transfer belt 41 in a direction perpendicular to the moving direction of the intermediate transfer belt 41. That is, the position of the detection sensor 80 in the lateral direction is not particularly restricted.

The major controller 60 instructs the image forming units 30Y, 30M, 30C, and 30K to form an image quality adjusting pattern T (image quality adjusting toner images) at a corner of the intermediate transfer belt 41 which opposes the detection sensor 80. In response to this instruction, an image quality adjusting pattern T is formed on the intermediate transfer belt 41, and the detection sensor 80 reads the image quality adjusting pattern T and sends a detection signal indicating the image quality adjusting pattern T to the major controller 60.

The major controller 60 generates, on the basis of the detection signal received from the detection sensor 80, control signals for correcting timings at which the lateral direction exposure and the process direction exposure are performed on each of the image forming units 30. The major controller 60 then sends the control signals to the laser driver 29 of the laser exposure device 26.

Configuration of Detection Sensor

A description will now be given of the configuration of a reading function unit provided in the detection sensor 80. The detection sensor 80 reads an image quality adjusting pattern T by using this reading function unit.

Figure 3:
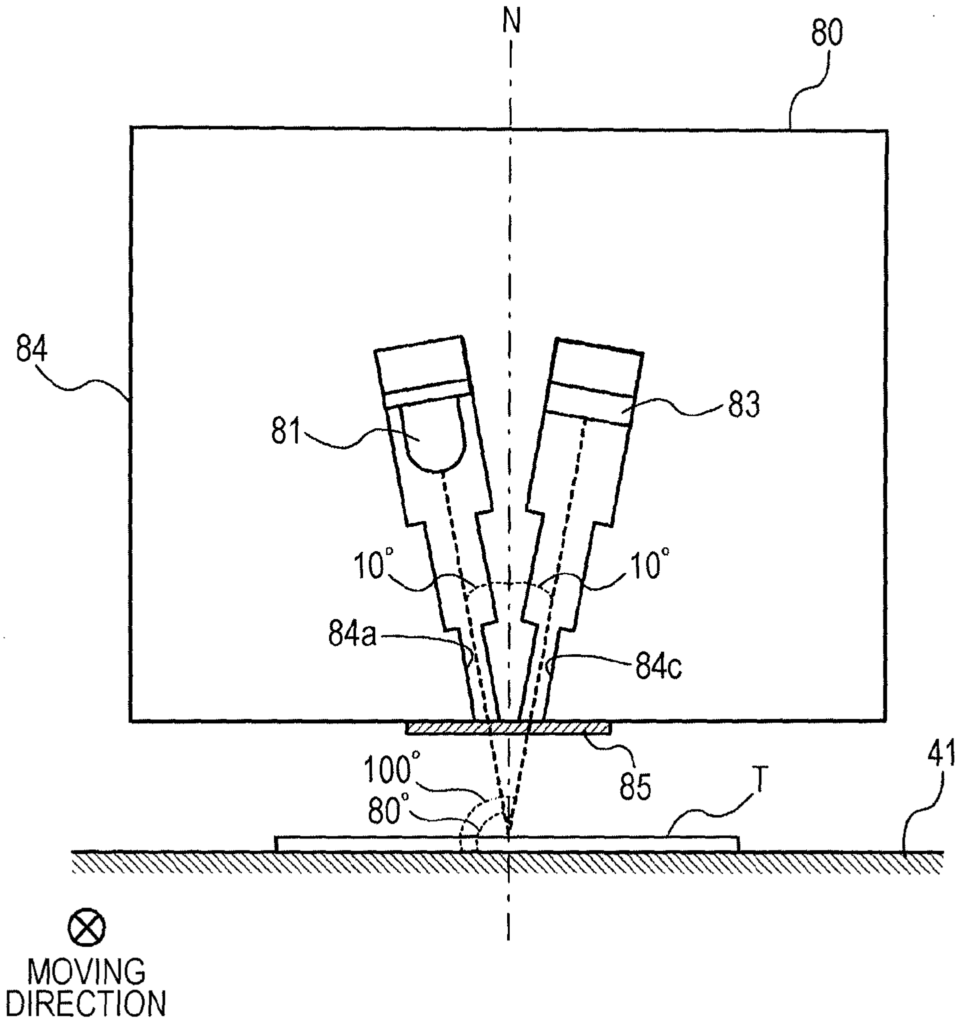
FIG. 3 illustrates the configuration of a reading function unit, provided in a detection sensor, which reads an image quality adjusting pattern.

FIG. 3 illustrates the configuration of the reading function unit, provided in the detection sensor 80, which reads an image quality adjusting pattern T. The detection sensor 80 includes, as shown in FIG. 3, a light emitting diode (LED) 81 and a photodiode 83 (PD). The LED 81, which is an example of a light source, has a center emission wavelength of 940 nm. The LED 81 applies light to the surface of the intermediate transfer belt 41 having toner images thereon and emits light to an image quality adjusting pattern T formed on the intermediate transfer belt 41. The PD 83, which is an example of a light receiver, receives light reflected by the intermediate transfer belt 41 and the image quality adjusting pattern T irradiated with light emitted from the LED 81, and outputs a current value indicating the intensity corresponding to the amount of received reflected light. That is, the PD 83 serves as a light receiver that receives light reflected by an image quality adjusting pattern T and generates a detection signal for detecting the image quality adjusting pattern T.

The LED 81 and the PD 83 are housed in a casing 84, which is an example of a support member having an opening downward, such that they are disposed in a direction perpendicular to the moving direction of the intermediate transfer belt 41. Light emitted from the LED 81 passes through an outgoing slit 84a provided in the casing 84 and is applied to the surface of the intermediate transfer belt 41 at an angle of, for example, 80°. The casing 84 is also provided with an entrance slit 84c that allows light reflected by the intermediate transfer belt 41 and the image quality adjusting pattern T to pass through the entrance slit 84c toward the PD 83. The entrance slit 84c is provided at an angle of, for example, 100°, with respect to the surface of the intermediate transfer belt 41.

That is, the outgoing slit 84a and the entrance slit 84c are formed such that they tilt, about the normal line N with respect to the surface of the intermediate transfer belt 41, by the same amount of angle (in this example, 10°) in a direction perpendicular to the moving direction of the intermediate transfer belt 41. With this arrangement, light reflected by the image quality adjusting pattern T and the intermediate transfer belt 41 irradiated with light emitted from the LED 81 is incident on the PD 83.

The outgoing slit 84a and the entrance slit 84c are formed such that the diameters thereof become smaller as they are farther away from the LED 81 and the PD 83, respectively. That is, the outgoing slit 84a and the entrance slit 84c are tapered, and the diameters thereof are the smallest at the opening (aperture) of the outgoing slit 84a through which light is emitted and at the opening (aperture) of the entrance slit 84c on which reflected light is incident. With this arrangement, the openings of the outgoing slit 84a and the entrance slit 84c serve as light restricting units disposed on the optical path.

The light restricting unit of the entrance slit 84c has the function of inhibiting diffused light reflected by the image quality adjusting pattern T from entering the PD 83. More specifically, the PD 83 configured as described above is located at a position at which it receives regular reflection light. At the same time, however, diffused light may also enter the PD 83. If diffused light enters the PD 83, a pattern detection signal generated by the PD 83 may be disturbed, which may make it difficult to correctly read the image quality adjusting pattern T. Thus, the entrance slit 84*c* is tapered such that the diameter thereof becomes smaller as it is farther away from the PD 83, thereby inhibiting diffused light from entering the PD 83, which would otherwise disturb a pattern detection signal.

In order to inhibit diffused light from entering the PD 83, the diameter of the opening of the entrance slit 84*c*, that is, the diameter of the entrance slit 84*c* on which light reflected by the image quality adjusting pattern T is incident, is preferably 1.5 mm or smaller. In this exemplary embodiment, the diameters of the openings of both of the outgoing slit 84*a* and the entrance slit 84*c* are about 1.1 mm. Even with this diameter, however, part of diffused light still enters the PD 83. Accordingly, in this exemplary embodiment, the influence of diffused light is further reduced by using a method, which will be discussed later.

In terms of inhibiting diffused light from entering the PD 83, the function as a light restricting unit implemented by the opening of the entrance slit 84*c* is necessary, but on the other hand, the function as a light restricting unit implemented by the opening of the outgoing slit 84*a* is not always necessary. However, if the function as a light restricting unit is also provided for the opening of the outgoing slit 84*a*, the spot of light applied to the image quality adjusting pattern T becomes even smaller. This improves the precision in reading the image quality adjusting pattern T, and also decreases the likelihood of diffused light being generated.

In order to inhibit diffused light from entering the PD 83, instead of providing a light restricting unit, as in this exemplary embodiment, a lens, for example, may be disposed within the entrance slit 84*c* or within both of the outgoing slit 84*a* and the entrance slit 84*c*. In this case, however, it is necessary to separately provide a lens, which increases the manufacturing cost of the detection sensor 80. In this exemplary embodiment, the manufacturing cost of the detection sensor 80 is less expensive, and the detection sensor 80 does not include an optical element, which refracts light, on the optical path.

A dirt prevention film 85 is provided on the bottom side of the casing 84 which opposes the intermediate transfer belt 41. The dirt prevention film 85 is provided such that it covers the openings of the outgoing slit 84*a* and the entrance slit 84*c*. The provision of the dirt prevention film 85 reduces the possibility of toner entering the inside of the outgoing slit 84*a* or the entrance slit 84*c*, which would otherwise make the LED 81 or the PD 83 dirty.

Functions of Major Controller and Detection Sensor Performing Registration Control The functions of the major controller 60 and the detection sensor 80 that perform registration control will be discussed below.

Figure 4:
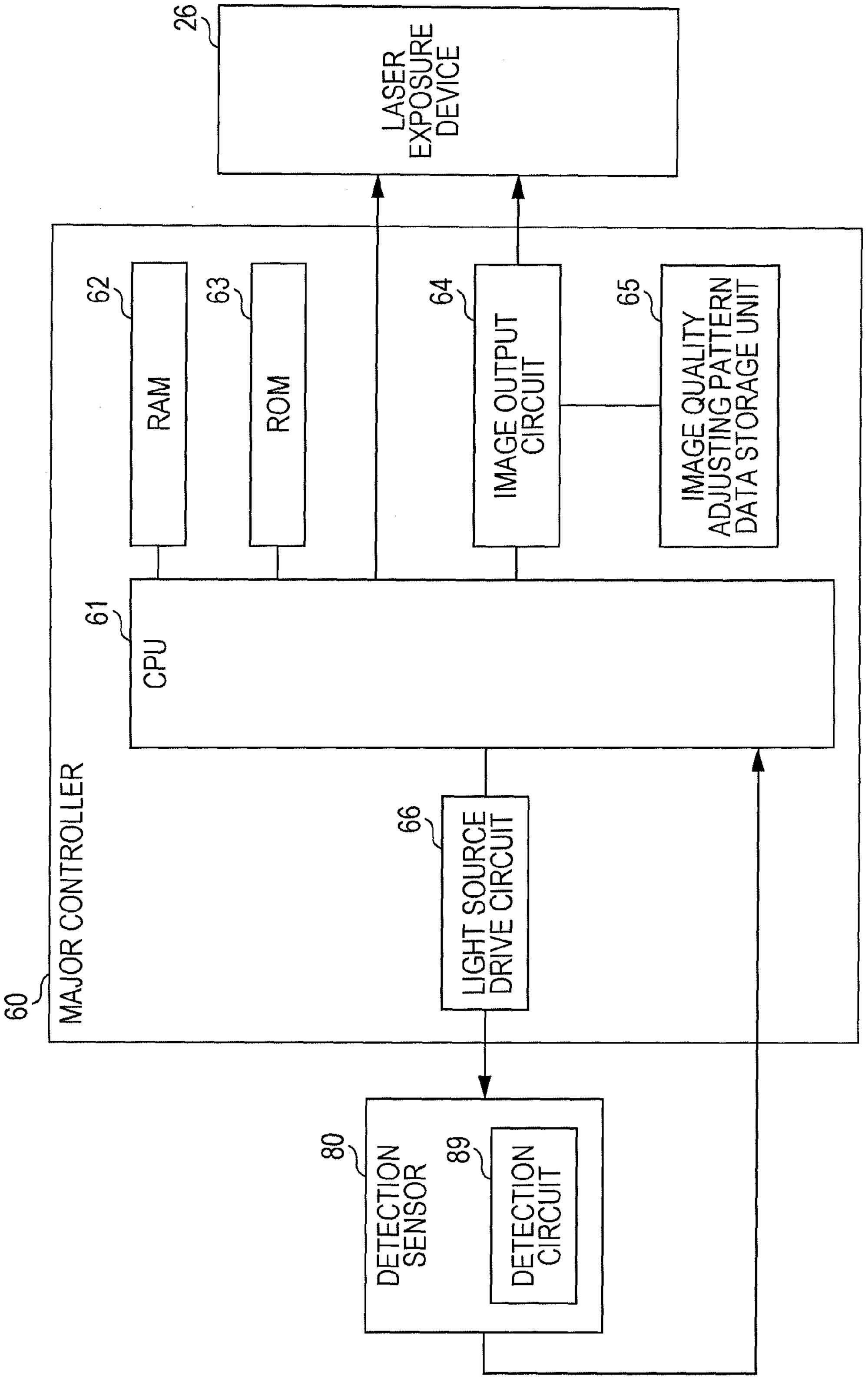
FIG. 4 is a block diagram illustrating the functions of a major controller and a detection sensor.

FIG. 4 is a block diagram illustrating the functions of the major controller 60 and the detection sensor 80. In FIG. 4, among blocks of the major controller 60 related to plural control operations, blocks only related to the above-described registration control are shown.

The major controller 60 includes a central processing unit (CPU) 61, a random access memory (RAM) 62, and a read only memory (ROM) 63. The CPU 61 executes arithmetic processing when performing registration control or control of an image forming operation performed by the image forming apparatus 1. In the ROM 63, a software program for, e.g., registration control, executed by the CPU 61 is stored. In the RAM 62, various counter values and temporary data generated during the execution of a program are stored.

The major controller 60 also includes an image output circuit 64 and an image quality adjusting pattern data storage unit 65. The image output circuit 64 outputs, in response to an instruction from the CPU 61, image information used for an actual image forming operation or image information for forming an image quality adjusting pattern T. The image quality adjusting pattern data storage unit 65 stores therein, in advance, image information (image data representing control marks) for forming an image quality adjusting pattern T. The image output circuit 64 outputs image information used for an actual image forming operation or image information for forming an image quality adjusting pattern T to the laser exposure device 26. The image output circuit 64 and the image quality adjusting pattern data storage unit 65 serve as an index forming unit.

The major controller 60 also includes a light source drive circuit 66 that controls ON/OFF operations of the LED 81 provided in the detection sensor 80.

The detection sensor 80 includes a detection circuit 89, in addition to a reading function, shown in FIGS. 3 and 4, of reading an image quality adjusting pattern T. The detection circuit 89 converts a current value corresponding to the amount of light output from the PD 83 (see FIG. 3) into a voltage value corresponding to the intensity of the current value, and then amplifies the voltage value, thereby generating a pattern detection signal. Then, the detection circuit 89 detects minimal values of the generated pattern detection signal and thereby generates a peak detection signal, and also generates a hold signal obtained by holding the minimal values of the pattern detection signal. The detection circuit 89 then outputs the peak detection signal and the hold signal to the major controller 60.

Figure 5:
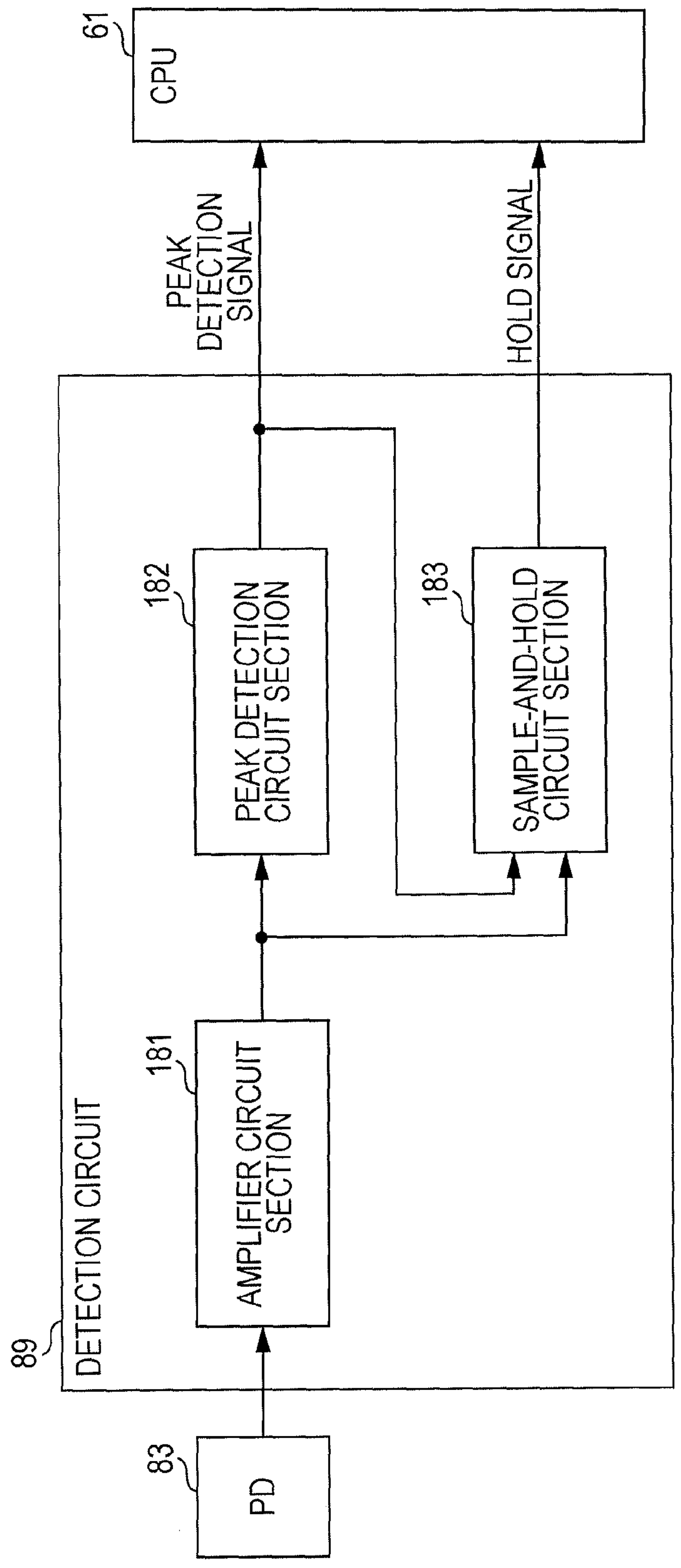
FIG. 5 illustrates the configuration of a detection circuit provided in a detection sensor.

FIG. 5 illustrates the configuration of the detection circuit 89 provided in the detection sensor 80. The detection circuit 89 includes, as shown in FIG. 5, an amplifier circuit section 181, a peak detection circuit section 182, and a sample-and-hold circuit section 183. The amplifier circuit section 181 converts a current value corresponding to the amount of light output from the PD 83 into a voltage value corresponding to the intensity of the current value, and then amplifies the voltage value, thereby generating a pattern detection signal. The peak detection circuit section 182 detects minimal values of the pattern detection signal output from the amplifier circuit section 181 so as to output a peak detection signal. The sample-and-hold circuit section 183 receives the pattern detection signal from the amplifier circuit section 181 and also outputs a hold signal obtained by holding the minimal values of the pattern detection signal when the peak detection signal is output from the peak detection circuit section 182. The detection circuit 89 then outputs the peak detection signal and the hold signal to the major controller 60 (CPU 61).

Registration Control Procedure

Figure 6:
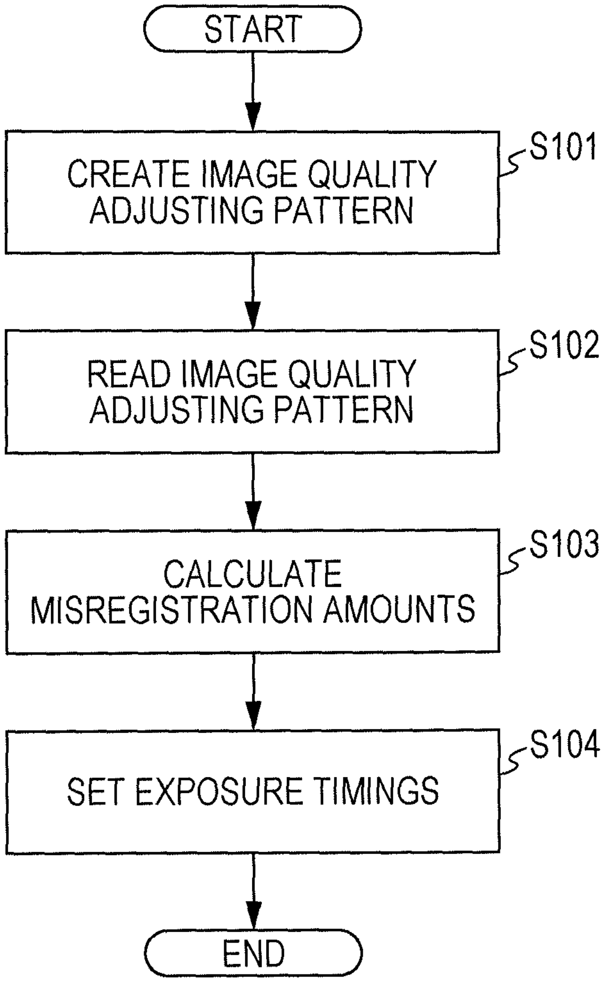
FIG. 6 is a flowchart illustrating a procedure for performing registration control of images formed in image forming units by using a major controller.

FIG. 6 is a flowchart illustrating a procedure for performing registration control of images formed in the image forming units 30Y, 30M, 30C, and 30K by using the major controller 60.

In step S101, the major controller 60 (image output circuit 64) forms an image quality adjusting pattern T at a predetermined portion on the intermediate transfer belt 41 by using the image forming units 30. The image quality adjusting pattern T is constituted by position control marks M of individual colors formed of black (K) toner images. In this case, K is a reference color. At this time, values for correcting misregistration amounts in the image forming units 30 are in the resetting state.

In step S102, the image quality adjusting pattern T formed on the intermediate transfer belt 41 is read by the detection sensor 80 (see FIG. 2).

Then, in step S103, the major controller 60 (CPU 61) calculates, on the basis of the results obtained by reading the image quality adjusting pattern T by using the detection sensor 80, amounts of absolute misregistration of a position control mark MK concerning black (K), which is a reference color, with respect to target values both in the lateral direction and in the process direction. The major controller 60 (CPU 61) also calculates amounts of relative misregistration of control position marks MY, MM, and MC concerning Y, M, and C with respect to the K position control mark MK both in the lateral direction and in the process direction. Then, in step S104, the major controller 60 newly sets, on the basis of the misregistration amounts of the individual colors both in the lateral direction and in the process direction, positions of toner images (electrostatic latent images) to be formed on the photoconductor drums 31 of the image forming units 30, i.e., the exposure timings at which the photoconductor drums 31 are to be exposed by using the laser exposure device 26, in the lateral direction and in the process direction. With this procedure, the positions at which toner images of individual colors are to be formed in the image forming units 30 are corrected. As a result, the occurrence of color misregistration in toner images formed on the intermediate transfer belt 41 is reduced. The CPU 61 serves as a misregistration correcting unit that corrects misregistration of images to be formed in the image forming units 30.

In this manner, in steps S101 through S104, registration control in the image forming units 30 is performed.

Image Quality Adjusting Pattern

Figure 7A:
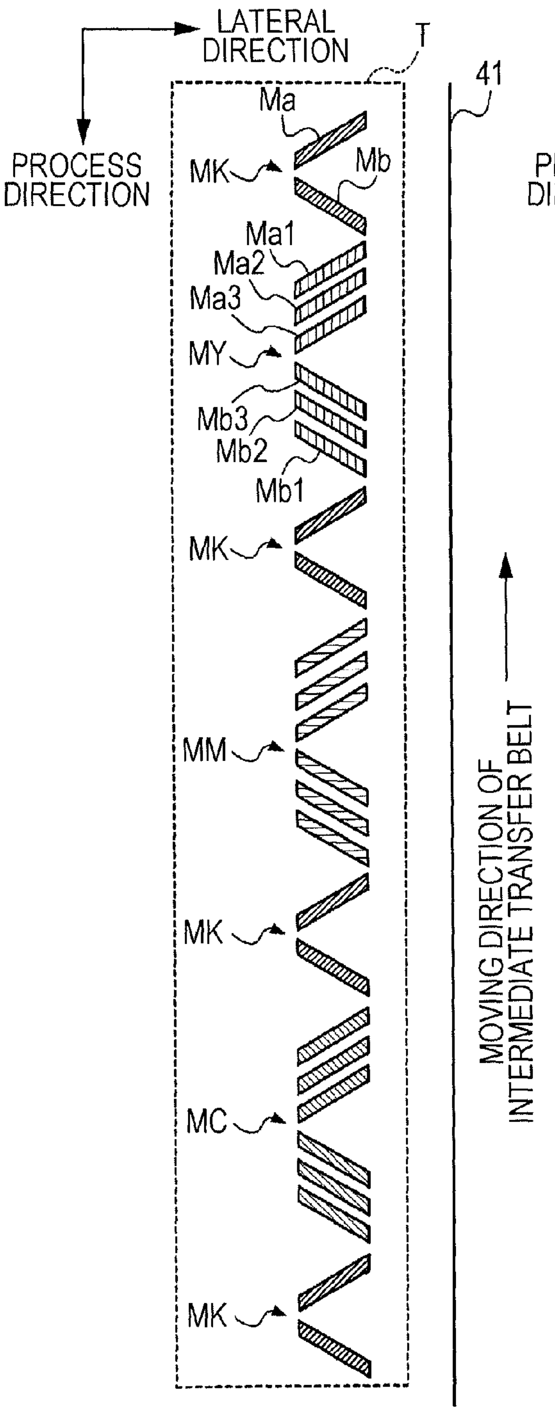
FIG. 7A illustrates an example of an image quality adjusting pattern of this exemplary embodiment.
Figure 7B:
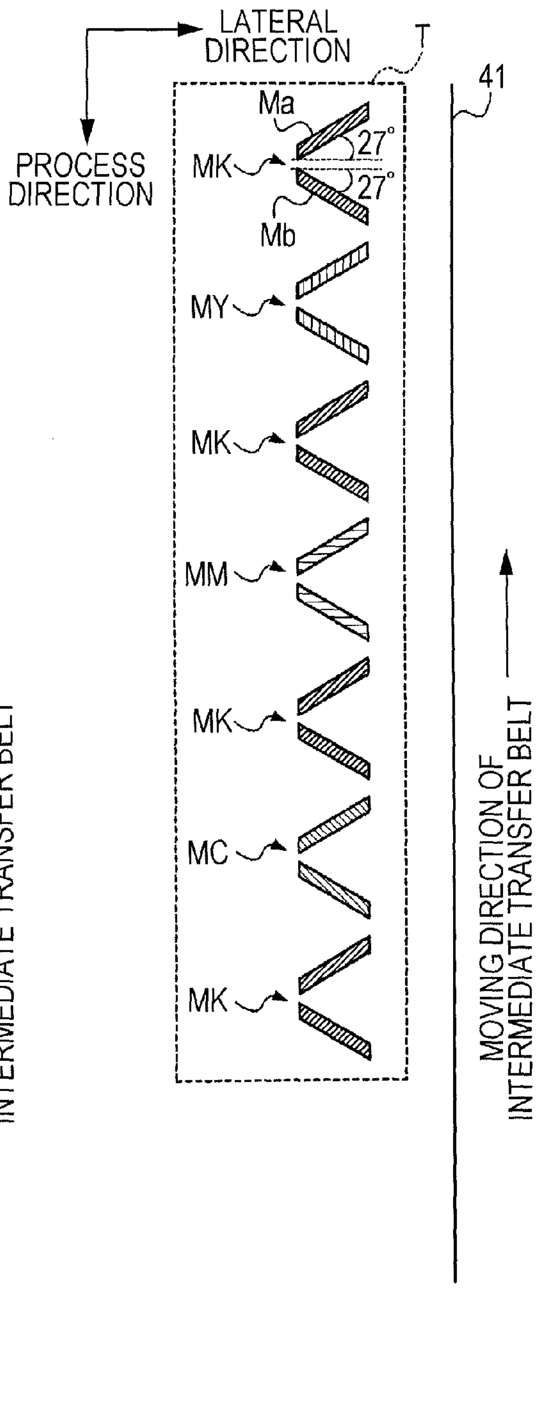
FIG. 7B RELATED ART
FIG. 7B illustrates an example of an image quality adjusting pattern of the related art.

FIG. 7A illustrates an example of an image quality adjusting pattern T which is read from the image quality adjusting pattern data storage unit 65 by the image output circuit 64 of the major controller 60 and which is formed on the intermediate transfer belt 41 by the image forming units 30Y, 30M, 30C, and 30K. FIG. 7B illustrates an example of an image quality adjusting pattern T of the related art.

As shown in FIGS. 7A and 7B, the image quality adjusting pattern T to be read by the detection sensor 80 (see FIG. 4) is formed along the moving direction (process direction) of the intermediate transfer belt 41. The image quality adjusting pattern T is constituted by position control marks MY, MM, MC, and MK (hereinafter may be collectively referred to as "position control marks M") formed of Y, M, C, and K toner images. The position control marks M function as image correcting indexes used for correcting misregistration of images to be formed by the image forming units 30.

Concerning the position control marks M, the position control marks MY, MM, and MC are alternately disposed with a position control mark MK, which serves as a reference, therebetween. Each of the position control marks M includes a first side Ma and a second side Mb, which is obliquely formed with respect to both the moving direction (process direction) of the intermediate transfer belt 41 and a direction perpendicular to the moving direction (lateral direction). With this arrangement, the first and second sides Ma and Mb are formed substantially in an inverted V shape. The first and second sides Ma and Mb have an angle of tilt 27° with respect to the lateral direction, and the angle between the first and second sides Ma and Mb is 54°. With this configuration, position control marks M serve as image correcting indexes (marks) for detecting the amounts of misregistration of toner images both in the lateral direction and in the process direction.

The position control marks MY, MM, and MC of this exemplary embodiment shown in FIG. 7A differ from those of the related art shown in FIG. 7B in the number of first sides Ma and the number of second sides Mb. That is, in the image quality adjusting pattern T of the related art shown in FIG. 7B, one first side Ma and one second side Mb are formed for each of the position control marks MY, MM, and MC. On the other hand, in the image quality adjusting pattern T of this exemplary embodiment shown in FIG. 7A, three first sides Ma1 Ma2, and Ma3 and three second sides Mb3, Mb2, and Mb1 are formed for each of the position control marks MY, MM, and MC. That is, a first side Ma and a second side Mb each serves as a pattern type, and concerning each of Y, M, and C colors, three sides are consecutively formed for each pattern type. Concerning K color, only one side is formed for each pattern type.

Operation of Detection Sensor for Reading Position Control Marks

A description will now be given of the operation for reading position control marks M of an image quality adjusting pattern T performed by the detection sensor 80.

Figure 8:
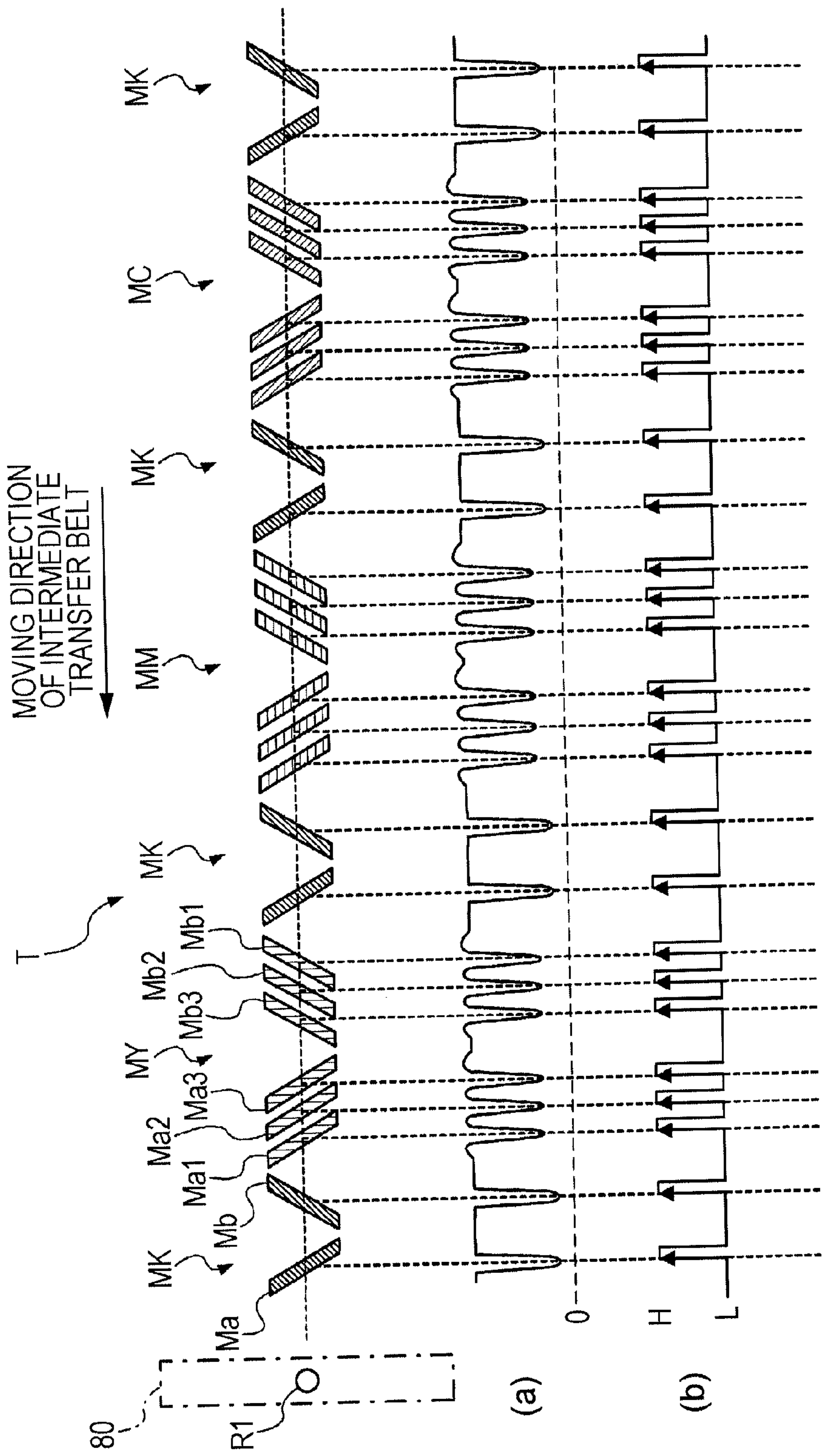
FIG. 8 is a timing chart illustrating signals generated as a result of reading position control marks by using a detection sensor.

FIG. 8 is a timing chart illustrating signals generated as a result of reading position control marks M by using the detection sensor 80. Part (a) of FIG. 8 illustrates a pattern detection signal generated as a result of reading position control marks M of an image quality adjusting pattern T by using the detection sensor 80. Part (b) of FIG. 8 illustrates a peak detection signal generated as a result of detecting minimal values (peaks) of the pattern detection signal by using the detection sensor 80.

A peak detection signal indicating a position control mark MY concerning Y will be discussed below by way of example. As shown in part (a) of FIG. 8, when the position control mark MY of the image quality adjusting pattern T enters a viewing region R1 of the PD 83 of the detection sensor 80, a pattern detection signal indicating the position control mark MY gradually falls as the overlapping area of the viewing region R1 and the first side Ma1 of the position control mark MY increases. Then, at a position at which the viewing region R1 is almost completely covered with the first side Ma1 of the position control mark MY, the pattern detection signal indicating the position control mark MY takes a minimal value. In this case, the thickness of the first side Ma1 of the position control mark MY is set to be slightly smaller than that of the diameter of the viewing region R1 of the PD 83. After the position at which the pattern detection signal takes a minimal value in accordance with the first side Ma1 of the position control mark MY, the overlapping area of the viewing region R1 and the position control mark MY gradually decreases, and the pattern detection signal gradually rises. Then, at a position at which the first side Ma1 of the position control mark MY is completely out of the viewing region R1 of the PD 83, the pattern detection signal takes a maximal value.

Then, the position control mark MY further moves, and when the first side Ma2 of the position control mark MY enters the viewing region R1 of the PD 83, the pattern detection signal starts to change again. As the position control mark MY further moves, the overlapping area of the viewing region R1 and the first side Ma2 of the position control mark MY gradually increases, and thus, the pattern detection signal gradually falls. Then, at a position at which the viewing region R1 is almost completely covered with the first side Ma2 of the position control mark MY, the pattern detection signal indicating the position control mark MY takes a minimal value. Thereafter, the overlapping area of the viewing region R1 and the first side Ma2 of the position control mark MY gradually decreases, and the pattern detection signal gradually rises and takes a maximal value again. When the position control mark MY further moves to cause the first side Ma3 of the position control mark MY to enter the viewing region R1 of the PD 83, the pattern detection signal changes in a similar manner.

When the central position of each of the first sides Ma1, Ma2, and Ma3 of the position control mark MY in the thickness direction matches the central position of the viewing region R1 of the PD 83, the pattern detection signal instantaneously takes a minimal value, as shown in part (a) of FIG. 8. The pattern detection signal takes a maximal value between two minimal values. Then, the peak detection circuit section 182 (see FIG. 5) of the pattern detection circuit 89 detects instantaneous minimal values (peaks) in the pattern detection signal indicating the position control marks M, and then generates a peak detection signal which rises from a low level (L) to a high level (H) in synchronization with the moment when the pattern detection signal takes a minimal value. The rising edges of the peak detection signal indicate the central positions of the first sides Ma1, Ma2, and Ma3 of the position control mark M. The detection sensor 80 detects the positions of the first sides Ma1, Ma2, and Ma3. The detection sensor 80 then outputs the generated peak detection signal to the major controller 60. The reason why the pattern detection signal falls when the detection sensor 80 reads a position control mark M is because the intermediate transfer belt 41 is glossy and sufficiently reflects light. That is, the reflectivity of a position control mark M is smaller than that of the intermediate transfer belt 41, and thus, the pattern detection signal falls when the detection sensor 80 reads a position control mark M. In the above-described example, a description has been given by taking the first sides Ma1, Ma2, and Ma3 of a position control mark M by way of example. A pattern detection signal and a peak detection signal are generated similarly when the detection sensor 80 reads the second sides Mb1, Mb2, and Mb3.

Concerning the position control mark MK, as shown in FIG. 8, the pattern detection signal takes one minimal value in accordance with each of the first side Ma and the second side Mb of the position control mark MK. Accordingly, as shown in part (b) of FIG. 8, the peak detection signal is caused to have a high level (peak) in synchronization with a minimal value of the pattern detection signal.

Pattern Detection Signal

A pattern detection signal generated as a result of reading position control marks M of an image quality adjusting pattern T by using the detection sensor 80 will be discussed in a greater detail.

Figure 9A:
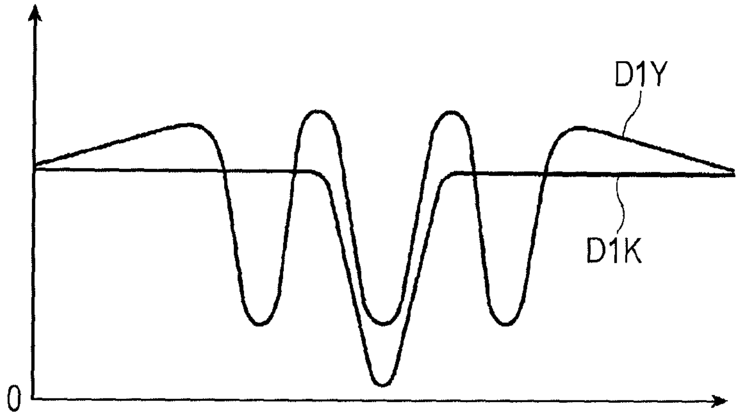
FIGS. 9A, 9B, and 9C illustrate pattern detection signals obtained when an image quality adjusting pattern of this exemplary embodiment is used.

FIG. 9A illustrates a pattern detection signal of this exemplary embodiment and, more specifically, FIG. 9A is an enlarged diagram illustrating the pattern detection signal shown in part (a) of FIG. 8. That is, the pattern detection signal shown in FIG. 9A is a pattern detection signal obtained as a result of reading the position control marks M shown in FIG. 7A. In FIG. 9A, a pattern detection signal D1Y obtained as a result of reading the position control mark MY concerning Y and a pattern detection signal D1K obtained as a result of reading the position control mark MK concerning K are shown.

Figure 10A:
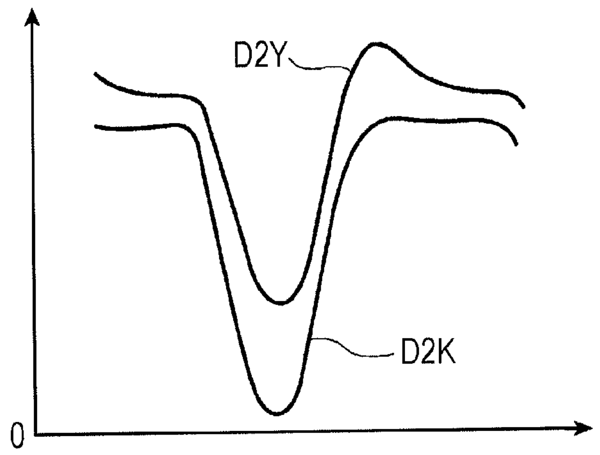
FIG. 10A RELATED ART
FIGS. 10A, 10B, and 10C illustrate pattern detection signals obtained when an image quality adjusting pattern of the related art is used.

A pattern detection signal shown in FIG. 10A is a pattern detection signal obtained as a result of reading the position control marks M of the image quality adjusting pattern T of the related art shown in FIG. 7B. In FIG. 10A, a pattern detection signal D2Y obtained as a result of reading the position control mark MY concerning Y and a pattern detection signal D2K obtained as a result of reading the position control mark MK concerning K are shown.

Upon comparing the pattern detection signal D2Y with the pattern detection signal D2K shown in FIG. 10A, it is seen that the detection peak minimal value at the center of the pattern detection signal D2Y is higher than that of the pattern detection signal D2K. Values indicated by pattern detection signal D2Y at positions corresponding to the intermediate transfer belt 41 without a position control mark M are also higher than those indicated by the pattern detection signal D2K. Additionally, the waveform of the pattern detection signal D2Y is not bilaterally symmetric with respect to the peak position (minimal value), and values on the right side are higher than those on the left side with respect to the peak position.

Figure 10B:
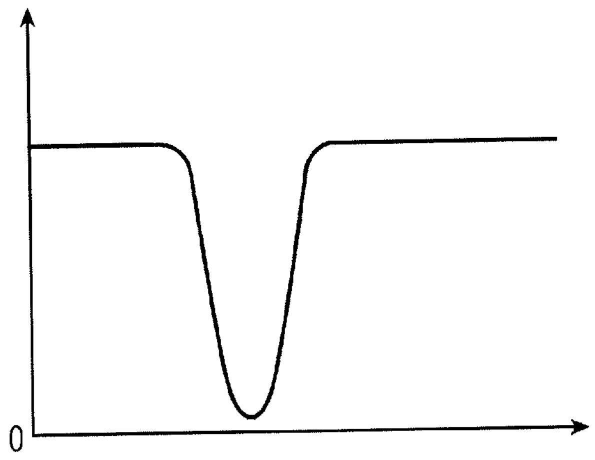
FIG. 10B RELATED ART
Figure 10C:
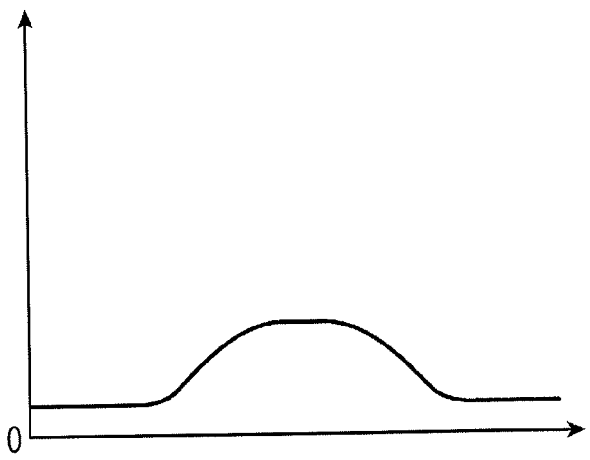
FIG. 10C RELATED ART

This is because the detection sensor 80 captures, not only regular reflection components shown in FIG. 10B, but also diffuse reflection components shown in FIG. 10C. Diffuse reflection components are generated because of light reflected (diffuse reflection) by an adjacent position control mark M irradiated with light. The waveform of the diffuse reflection components is not bilaterally symmetric with respect to the peak position. Accordingly, the waveform of the pattern detection signal D2Y shown in FIG. 10A, which is obtained by combining the regular reflection components with the diffuse reflection components, is not bilaterally symmetric with respect to the peak position. This phenomenon occurs not only in Y, but also in M and C. The reason why this phenomenon does not occur in the pattern detection signal D2K is because the amount of diffuse reflection light generated by the position control mark MK is negligible.

In this manner, when reading position control marks M of the related art, the waveform of a pattern detection signal MK concerning K is different from those of pattern detection signals concerning the other colors. Since the pattern detection signals concerning the colors other than K include diffuse reflection components, which make the waveforms of the pattern detection signals asymmetric, the peak positions deviate from those as they should be. Accordingly, the peak position of K is different from the peak positions of the other colors. This makes it difficult to precisely perform misregistration correction.

In contrast, upon comparing the pattern detection signal D1Y with the pattern detection signal D1K shown in FIG. 9A, it is seen that the waveform of the pattern detection signal D1Y is bilaterally symmetric with respect to the minimal value (peak position) at the center.

Figure 9B:
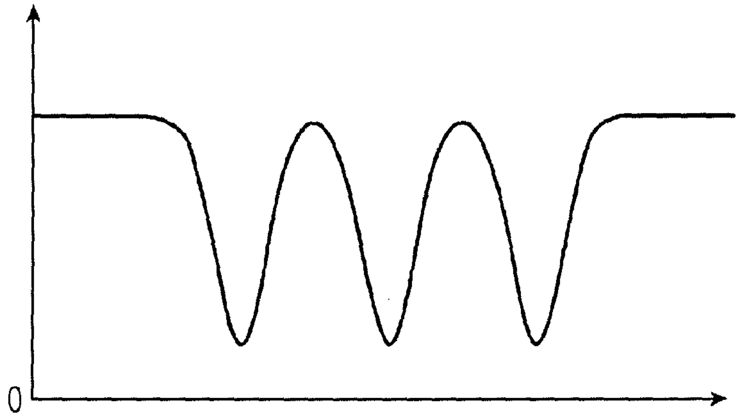
Figure 9C:
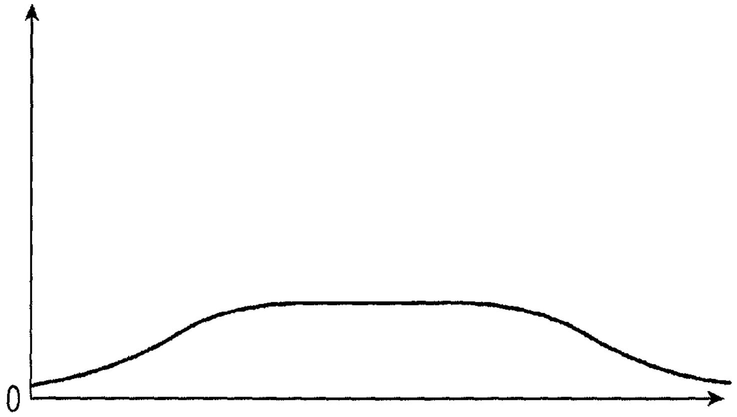

The pattern detection signal D1Y shown in FIG. 9A is obtained by combining the regular reflection components shown in FIG. 9B with the diffuse reflection components shown in FIG. 9C. The waveform of the diffuse reflection components shown in FIG. 9C is bilaterally symmetric with respect to the maximal value, unlike the diffuse reflection components shown in FIG. 100. The reason for this is because the pattern detection signal D1Y takes three minimal values (peak positions) at small intervals, which makes the waveform of the diffuse reflection components broad. Accordingly, the waveform of the diffuse reflection components becomes almost flat at a position corresponding to the central minimal value of the waveform of the pattern detection signal D1Y. Thus, the waveform of the pattern detection signal D1Y shown in FIG. 9A is bilaterally symmetric with respect to the central minimal value. That is, the position of the central minimal value of the pattern detection signal D1Y is not substantially changed even by the presence of diffuse reflection components.

Because of the above-described reason, as a result of reading the position control marks M of this exemplary embodiment, the waveforms of the pattern detection signals concerning all the colors become bilaterally symmetric. In this exemplary embodiment, concerning K, misregistration correction is performed by using, as a detection position, a position at which the pattern detection signal D1K takes a minimal value. Concerning Y, M, and C, misregistration correction is performed by using, as a detection position, a position at which each of the pattern detection signal takes the central minimal value. With this arrangement, there is almost no deviation of the detection position between K and the other colors, thereby making it possible to precisely perform misregistration correction. As discussed with reference to FIG. 7A, regarding position control marks concerning Y, M, and C other than K, three position control marks M (three sides) are consecutively formed for one pattern type. On the other hand, regarding a position control mark concerning K, only one position control mark M (one side) is formed for one pattern type. The reason for this is as follows. It is more likely that diffuse reflection light is generated for Y, M, and C. However, it is less likely that diffuse reflection light is generated for K, and thus, a position control mark similar to the one of the related art may safely be used for K.

Detection of Misregistration Amounts and Correction Thereof

A description will now be given of the detection of misregistration amounts and the correction thereof by using a peak detection signal output from the detection sensor 80.

Figure 11:
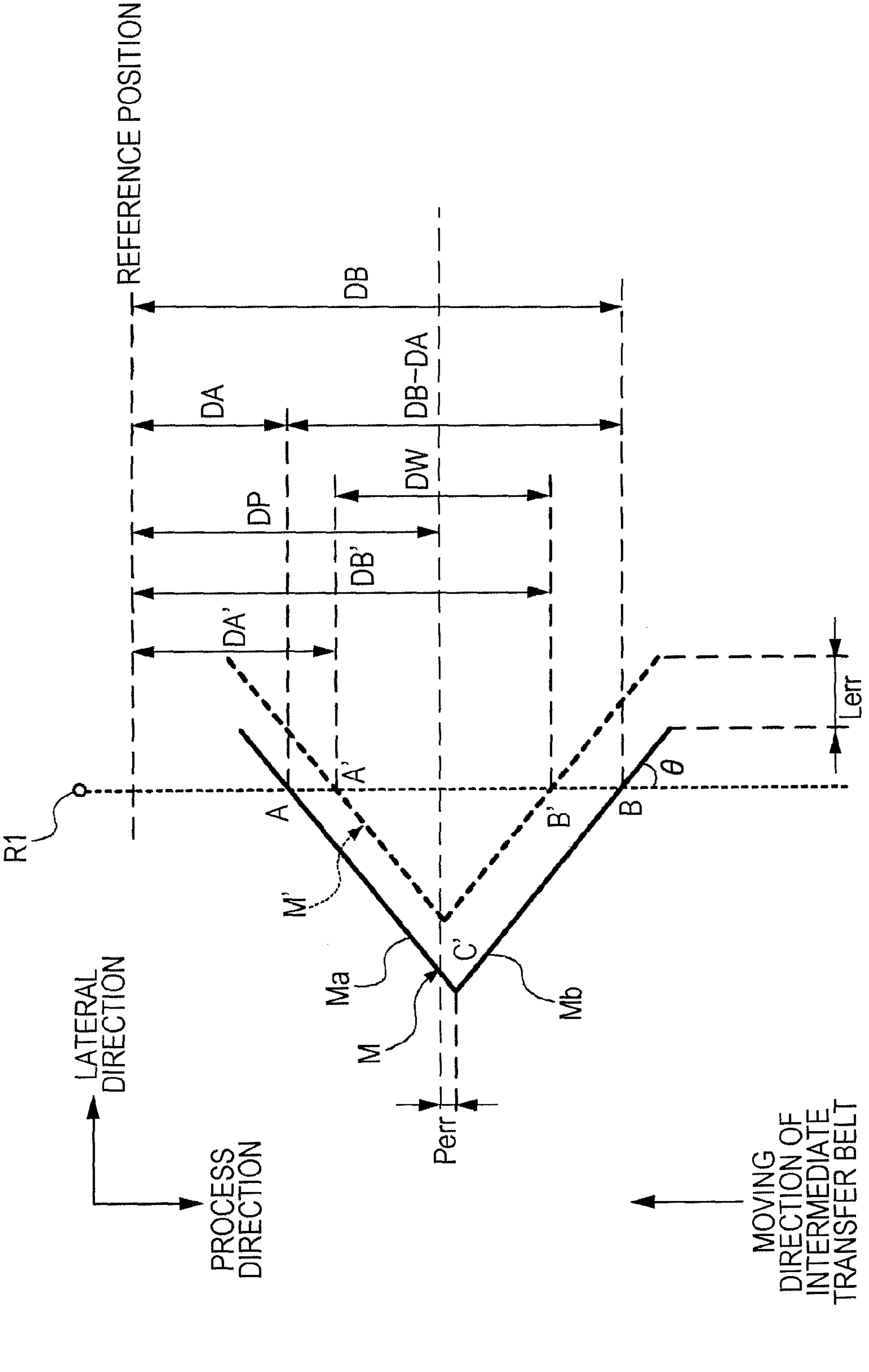
FIG. 11 illustrates an approach to calculating misregistration amounts by using position control marks.

FIG. 11 illustrates an approach to calculating misregistration amounts by using position control marks M of an image quality adjusting pattern T.

In the following description, an approach to calculating misregistration amounts concerning Y, M, and C will be discussed. More specifically, the positions of central minimal values of pattern detection signals concerning Y, M, and C are detected, and misregistration amounts are calculated on the basis of the positions of the central minimal values. In the actual operation, the CPU 61 determines the positions of the peak detection signal shown in part (b) of FIG. 8 corresponding to the first side Ma2 and the second side Mb2 of each position control mark M and then performs the following calculation. Accordingly, the CPU 61 serves as a position specifying unit that specifies, by using a pattern detection signal, the position of a position control mark M (side Ma or Mb) disposed at the center of three consecutive position control marks M (three sides Ma or Mb).

In FIG. 11, the solid line indicates the position of a central minimal value of the pattern detection signal, while the broken line indicates the position of the minimal value in the ideal state (ideal position).

In FIG. 11, the distance from a reference position, which is preset on the intermediate transfer belt 41, to a detection position A of the first side Ma2 is indicated by DA, and the distance from the reference position to a detection position B of the second side Mb2 is indicated by DB. Then, the amount of misregistration of the position control mark M in the lateral direction (hereinafter referred to as the "lateral misregistration amount") Lerr corresponds to the difference between DA and DB since the first side Ma and the second side Mb are formed symmetrically. At the ideal position, the first side Ma2 is detected at a detection position A' and the second side Mb2 is detected at a detection position B'. Then, when the difference between DA and DB in this case is set to be DW, the lateral misregistration amount Lerr is found by the following equation (1):

$$Lerr=((DB-DA-DW)\times 0.5)\times \tan\theta \quad (1)$$

where θ is the angle between the first side Ma or the second side Mb and the process direction, and in this exemplary embodiment, 90°−27°=63°. DW is calculated by multiplying the length of the first side Ma or the second side Mb by cos θ, assuming that the viewing region R1 of the PD 83 of the detection sensor 80 is positioned at the intermediate portion of the ideal state in the lateral direction.

The amount of misregistration of the position control mark M in the process direction (hereinafter referred to as the "process misregistration amount") Perr is also found on the basis of DA and DB. More specifically, the intermediate position between the detection position A' and the detection position B' of the ideal state is indicated by C', and the distance from the reference position to the intermediate position C' is indicated by DP. Then, the process misregistration amount Perr is found by the following equation (2) since the first side Ma and the second side Mb are formed symmetrically.

$$Perr=0.5\times(DA+DB)-DP \quad (2)$$

When the distance from the reference position to the detection position A' of the first side Ma2 in the ideal state is indicated by DA' and when the distance from the reference position to the detection position B' of the second side Mb2 in the ideal state is indicated by DB', DP=(DA'+DB')/2.

In the actual operation, the detection sensor 80 outputs a peak detection signal indicating the detection position A of the first side Ma2 and the detection position B of the second side Mb2 to the major controller 60. Then, the major controller 60 calculates the lateral misregistration amount Lerr (1) and the process misregistration amount Perr (2) by using the timings at which the major controller 60 receives the peak detection signal indicating the detection positions A and B from the detection sensor 80. That is, the major controller 60 measures the lateral misregistration amount Lerr (1) and the process misregistration amount Perr (2) by using the timings at which the major controller 60 received the peak detection signal indicating the detection positions A and B as times TA and TB which are necessary for the intermediate transfer belt 41 to move from the reference position by the distances DA and DB, respectively. When the moving speed (process speed) of the intermediate transfer belt 41 is indicated by V, DA=TA×V and DB=TB×V. Additionally, the time TW necessary for the intermediate transfer belt 41 to move by the distance DW is obtained by dividing a value which is obtained by multiplying the length of the first side Ma or the second side Mb by cos θ by the process speed V.

Accordingly, the major controller 60 determines the lateral misregistration amount Lerr (1) and the process misregistration amount Perr (2) by the following equations (3) and (4), respectively, on the basis of the times TA and TB at which the major controller 60 received the peak detection signal indicating the detection positions A and B, respectively:

$$Lerr(1)=((TB-TA-TW)\times V\times 0.5)\times\tan\theta \quad (3)$$

$$Perr(2)=(0.5\times(TA+TB)-TP)\times V \quad (4)$$

where TP is a time necessary for the intermediate transfer belt 41 to move from the reference position to the intermediate position C' by the distance DP and is expressed by TP=(DA'+DB')/2V.

On the basis of the lateral misregistration amount Lerr (1) and the process misregistration amount Perr (2), which are calculated from the position control mark M' in the ideal state by using equations (3) and (4), respectively, the major controller 60 also calculates the relative lateral misregistration amount Lerr (1)' and the relative process misregistration amount Perr (2)' between the position control mark MK and each of the position control marks MY, MM, and MC.

In the above-described example, the approach to calculating misregistration amounts concerning Y, M, and C has been discussed. In the case of K, misregistration amounts may be calculated in a similar manner on the basis of the position of a minimal value of a pattern detection signal concerning K.

Other Examples of Image Quality Adjusting Pattern

The image quality adjusting pattern T is not restricted to that shown in FIG. 7A. For example, the image quality adjusting pattern T may be modified depending on the wavelength of the LED 81.

Figure 12:
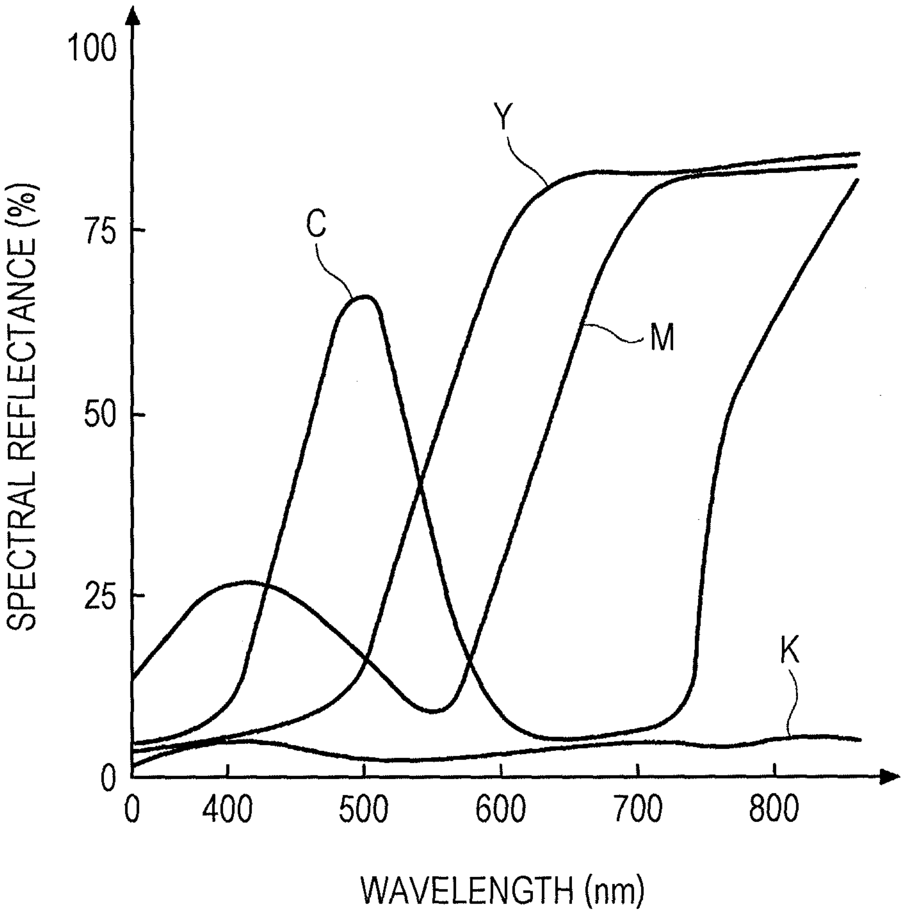
FIG. 12 illustrates the spectral reflectance concerning Y, M, C, and K toners with respect to the optical wavelength.

FIG. 12 illustrates the spectral reflectance concerning Y, M, C, and K toners with respect to the optical wavelength. In FIG. 12, the horizontal axis indicates the optical wavelength, and the vertical axis indicates the spectral reflectance.

When position control marks M formed by using Y, M, C, and K toners are irradiated with light by using the LED 81 having a center emission wavelength of 940 nm, such as that shown in FIG. 3, the spectral reflectance of each of Y, M, and C is about 75%. In contrast, the spectral reflectance of K is almost 0%. In this case, since the spectral reflectance of K is low, almost no diffuse reflection light components are generated. In contrast, the spectral reflectance of each of Y, M, and C is high, and thus, a large amount of diffuse reflection light is generated. Because of this reason, as shown in FIG. 7A, concerning Y, M, and C, three position control marks M (three sides) of an image quality adjusting pattern T are consecutively formed for each pattern type. On the other hand, concerning K, it is sufficient that only one position control mark M (one side) of an image quality adjusting pattern T be formed for each pattern type.

A case in which an LED having a center emission wavelength of 680 nm is used as the LED 81 will be considered. In this case, when position control marks M formed by using Y, M, C, and K toners are irradiated with light by using the LED 81, the spectral reflectance of each of M and Y is about 75%, while the spectral reflectance of each of C and K is almost 0%. Thus, concerning Y and M, three position control marks M (three sides) are consecutively formed for each pattern type. On the other hand, concerning C and K, it is sufficient that only one position control mark M (one side) be formed for each pattern type.

Figure 13:
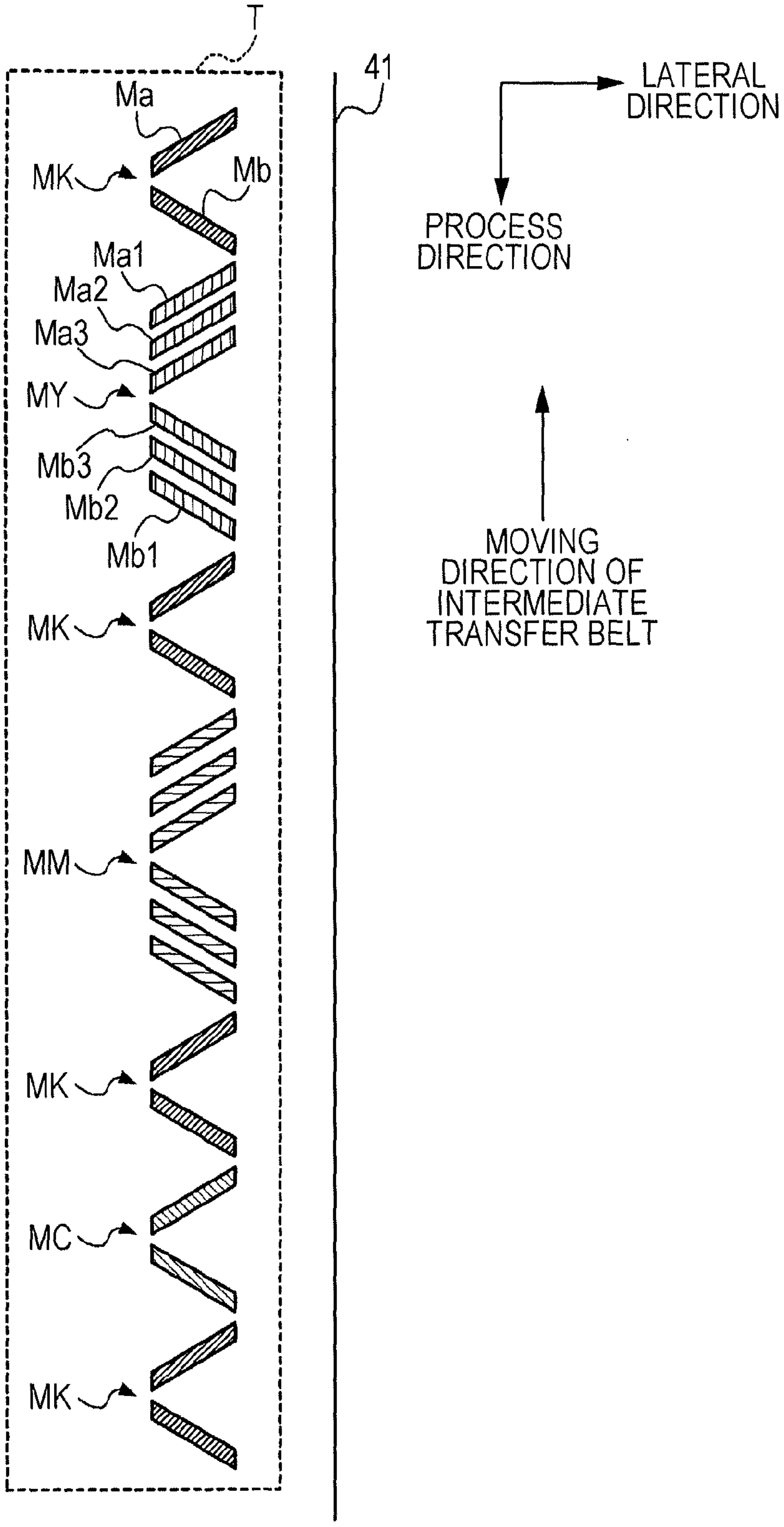
FIG. 13 illustrates an example of an image quality adjusting pattern when a light emitting diode (LED) having a center emission wavelength of 680 nm is used.

FIG. 13 illustrates an example of an image quality adjusting pattern T when an LED having a center emission wavelength of 680 nm is used as the LED 81.

In the image quality adjusting pattern T, as shown in FIG. 13, three first sides Ma and three second sides Mb of each of position control marks MY and MM concerning Y and M are formed. The three first sides Ma are shown as Ma1, Ma2, and Ma3, and the three second sides Mb are shown as Mb3, Mb2, and Mb1. In contrast, one first side Ma and one second side Mb of each of position control marks MC and MK concerning C and K are formed.

Figure 14:
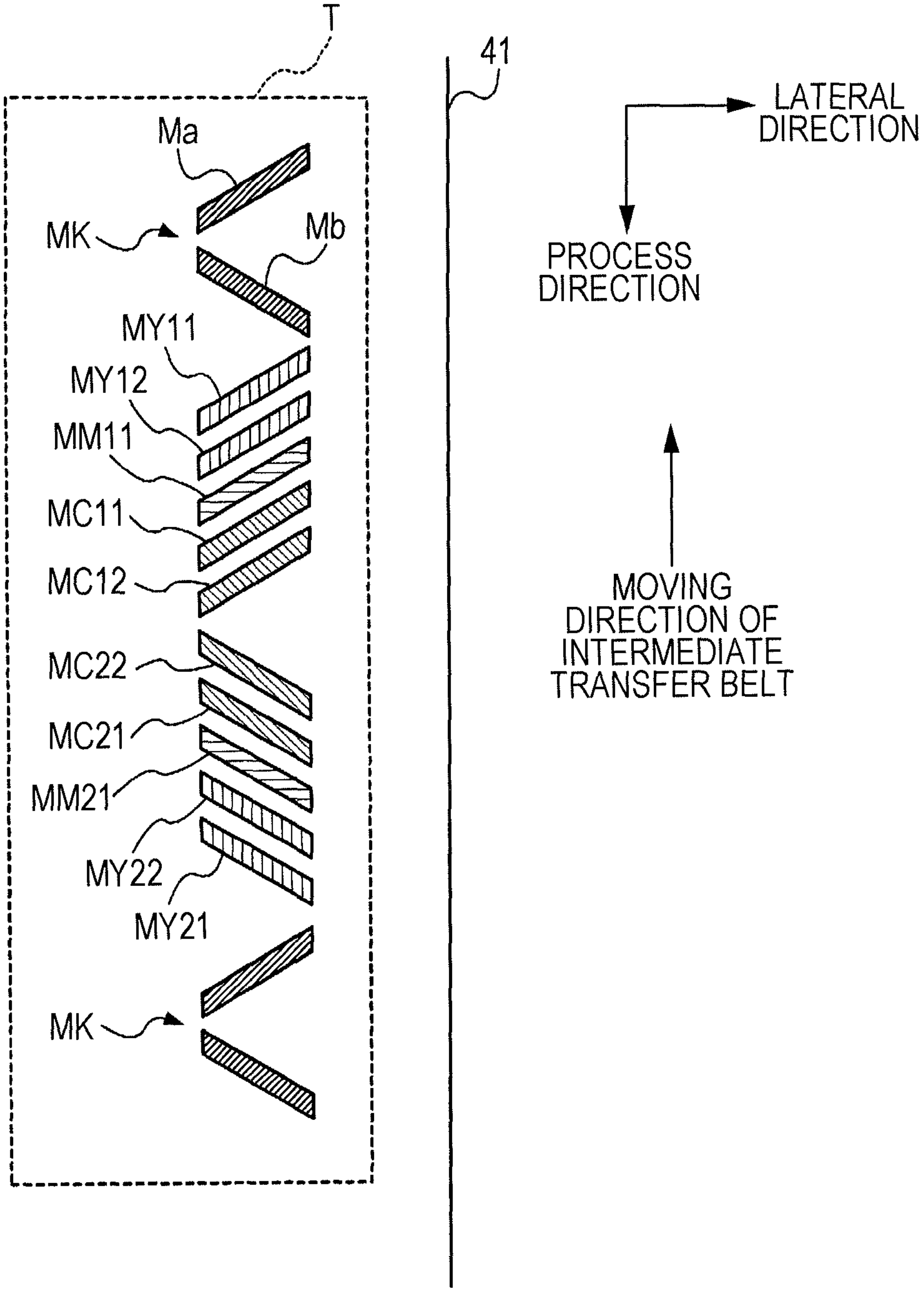
FIG. 14 illustrates another example of an image quality adjusting pattern.

FIG. 14 illustrates another example of an image quality adjusting pattern T. This type of image quality adjusting pattern T may be utilized when an LED having a center emission wavelength of 940 nm is used as the LED 81, as in the case shown in FIG. 7A.

In the image quality adjusting pattern T shown in FIG. 14, position control marks MY, MM, and MC concerning Y, M, and C are interposed between a pair of position control marks MK concerning K. The position control marks MY, MM, and MC constituted by first sides Ma are formed on the upper part of FIG. 14, and the position control marks MY, MM, and MC constituted by second sides Mb are formed on the lower part of FIG. 14. The first sides Ma are constituted by five control marks M, such as a Y position control mark MY11, a Y position control mark MY12, an M position control mark MM11, a C position control mark MC11, and a C position control mark MC12, from the top to the bottom of FIG. 14. The second sides Mb are constituted by five control marks M, such as a C position control mark MC22, a C position control mark MC21, an M position control mark MM21, a Y position control mark MY22, and a Y position control mark MY21, from the top to the bottom of FIG. 14.

Correction for misregistration of K may be performed by using the position control marks MK, in a manner described above.

Correction for misregistration of Y may be performed by detecting the positions of the position control marks MY12 and MY22. That is, the three position control marks MY11, MY12, and MM11 are formed into one set, and the position control mark MY12 located at the center of the set is detected. The three position control marks MM21, MY22, and MY21 are formed into one set, and the position control mark MY22 located at the center of the set is detected. With this arrangement, misregistration correction may be performed in a manner similar to the approach described above. In this case, however, unlike the case shown in FIG. 7A, the position control marks MY12 and MY22 are adjacent to another color of position control marks, i.e., the position control marks MM11 and MM21, respectively. Even in this case, since the spectral reflectance of Y is roughly the same as that of C, as discussed with reference to FIG. 12, a pattern detection signal similar to the pattern detection signal D1Y shown in FIG. 9A is obtained. Accordingly, the positions of the position control marks MY12 and MY22 are detected without being influenced by the position control marks MM1 and MM21, respectively. That is, it is not always necessary to use the same color for three consecutive position control marks M described above as long as the spectral reflectance factors of consecutive position control marks M with respect to light emitted from the LED 81 are roughly the same.

Correction for misregistration of M may be performed by detecting the position of the position control mark MM11 from a set of the position control marks MY12, MM11, and MC11 and also by detecting the position of the position control mark MM21 from a set of the position control marks MC21, MM21, and MY22.

Correction for misregistration of C may be performed by detecting the position of the position control mark MC11 from a set of the position control marks MM11, MC11, and MC12 and also by detecting the position of the position control mark MC21 from a set of the position control marks MC22, MC21, and MM21.

In this manner, four or more position control marks of one pattern type may be formed. In this case, the CPU 61 detects the position of a position control mark (image correcting index) located at the center of three consecutive position control marks (image correcting indexes) from a pattern detection signal, and the major controller 60 performs misregistration correction on the basis of the detected position of the image correcting index.

Processing executed by the major controller 60 in this exemplary embodiment may be implemented by the operation of software and hardware resources. For example, the CPU 61 within a computer provided in the major controller 60 may load a program that implements functions of the major controller 60 into the RAM 62 and may execute the program.

The processing executed by the major controller 60 may be implemented as a program causing a computer to implement: a function of causing the image forming unit 30 to form three or more consecutive position control marks M of one type by using an identical color, the position control marks M being used for correcting misregistration of an image to be formed by the image forming unit 30 using predetermined plural colors; a function of obtaining a detection signal for detecting the position control marks M from the detection sensor 80 which includes the LED 81 that emits light to the position control marks M and the PD 83 that receives light reflected by the intermediate transfer belt 41 and the position control marks M so as to generate the detection signal; a function of specifying a position of a position control mark M located at the center of three consecutive position control marks M by using the detection signal obtained from the PD 83 of the detection sensor 80; and a function of correcting misregistration of an image to be formed by the image forming unit 30 by using the specified position of the position control mark M located at the center of the three position control marks M.

The program implementing this exemplary embodiment may be provided by using a communication medium or may be provided as a result of storing it in a recording medium, such as a compact disc read only memory (CD-ROM).

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:

an image forming unit that forms an image by using a plurality of predetermined colors;

an index forming unit that causes the image forming unit to form a first set of three or more consecutive image correcting indexes of one direction and a second set of three or more consecutive image correcting indexes of another direction between reference marks of a first color, the first set and the second set of image correcting indexes being consecutively formed and comprising an identical second color being used for correcting misregistration of an image to be formed by the image forming unit;

an image carrier onto which the image correcting indexes formed by the image forming unit are sequentially transferred;

a detector including a light source that emits light to the image correcting indexes and a light receiver that receives light reflected by the image carrier and the image correcting indexes so as to generate a detection signal for detecting the image correcting indexes;

a position specifying unit that specifies a position of an image correcting index located at the center of three consecutive image correcting indexes by using the detection signal obtained from the light receiver of the detector; and a misregistration correcting unit that corrects misregistration of an image to be formed by the image forming unit by using the specified position of the image correcting index located at the center of the three consecutive image correcting indexes, wherein the identical second color comprises a color other than black.

2. The image forming apparatus according to claim 1, wherein the detector does not include an optical element, which refracts light emitted from the light source or light reflected by the image carrier and the image correcting indexes, on an optical path.

3. An image forming apparatus comprising:

an image forming unit that forms an image by using a plurality of predetermined colors;

an index forming unit that causes the image forming unit to form a first set of three or more consecutive image correcting indexes of one direction and a second set of three or more consecutive image correcting indexes of another direction between reference marks of a first color, the first set and the second set of image correcting indexes being consecutively formed and comprising an identical second color being used for correcting misregistration of an image to be formed by the image forming unit;

an image carrier onto which the image correcting indexes formed by the image forming unit are sequentially transferred;

a detector including a light source that emits light to the image correcting indexes and a light receiver that receives light reflected by the image carrier and the image correcting indexes so as to generate a detection signal for detecting the image correcting indexes;

a position specifying unit that specifies a position of an image correcting index located at the center of three consecutive image correcting indexes by using the detection signal obtained from the light receiver of the detector; and a misregistration correcting unit that corrects misregistration of an image to be formed by the image forming unit by using the specified position of the image correcting index located at the center of the three consecutive image correcting indexes, wherein spectral reflectance factors of the three consecutive image correcting indexes formed by the image forming unit with respect to light emitted from the light source are substantially the same, and wherein the identical second color comprises a color other than black.

4. An image forming method comprising:

forming a first set of three or more consecutive image correcting indexes of one direction and a second set of three or more consecutive image correcting indexes of another direction between reference marks of a first color, the first set and the second set of image correcting indexes being consecutively formed and comprising an identical second color being used for correcting misregistration of an image to be formed;

obtaining a detection signal generated from light reflected by an image carrier and the image correcting indexes irradiated with light emitted to the image correcting indexes, the detection signal being used for detecting the image correcting indexes;

specifying a position of an image correcting index located at the center of three consecutive image correcting indexes by using the obtained detection signal; and correcting misregistration of an image to be formed by using the specified position of the image correcting index located at the center of the three consecutive image correcting indexes, wherein the identical second color comprises a color other than black.

5. A non-transitory computer readable medium storing a program causing a computer to execute a process, the process comprising:

forming a first set of three or more consecutive image correcting indexes of one direction and a second set of three or more consecutive image correcting indexes of another direction between reference marks of a first color, the first set and the second set of image correcting indexes being consecutively formed and comprising an identical second color being used for correcting misregistration of an image to be formed;

obtaining a detection signal generated from light reflected by an image carrier and the image correcting indexes irradiated with light emitted to the image correcting indexes, the detection signal being used for detecting the image correcting indexes;

specifying a position of an image correcting index located at the center of three consecutive image correcting indexes by using the obtained detection signal; and correcting misregistration of an image to be formed by using the specified position of the image correcting index located at the center of the three consecutive image correcting indexes, wherein the identical second color comprises a color other than black.

* * * * *